(12) United States Patent
Ge et al.

(10) Patent No.: US 9,495,316 B2
(45) Date of Patent: Nov. 15, 2016

(54) SYSTEM AND METHOD FOR AN ASYNCHRONOUS PROCESSOR WITH A HIERARCHICAL TOKEN SYSTEM

(71) Applicant: Huawei Technologies Co., Ltd., Shenzhen (CN)

(72) Inventors: Yiqun Ge, Kanata (CA); Wuxian Shi, Kanata (CA); Qifan Zhang, Lachine (CN); Tao Huang, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/480,330

(22) Filed: Sep. 8, 2014

(65) Prior Publication Data

US 2015/0074787 A1 Mar. 12, 2015

Related U.S. Application Data

(60) Provisional application No. 61/874,883, filed on Sep. 6, 2013.

(51) Int. Cl.
*G06F 13/38* (2006.01)
(52) U.S. Cl.
CPC .................. *G06F 13/385* (2013.01)
(58) Field of Classification Search
CPC combination set(s) only.
See application file for complete search history.

(56) References Cited

U.S. PATENT DOCUMENTS

| | | | |
|---|---|---|---|
| 4,811,214 A | 3/1989 | Nosenchuck et al. | |
| 5,021,947 A | 6/1991 | Campbell et al. | |
| 6,079,009 A * | 6/2000 | Wise | G06F 9/3867 375/E7.093 |
| 6,217,234 B1 | 4/2001 | Dewar et al. | |
| 8,402,164 B1 * | 3/2013 | Parlour | G06F 15/163 370/258 |
| 2006/0120189 A1 | 6/2006 | Beerel et al. | |
| 2011/0055516 A1 * | 3/2011 | Willis | G01R 31/318364 712/2 |

OTHER PUBLICATIONS

Laurence, Michel "Introduction to Octasic Asynchronous Processor Technology", 2012 IEEE, pp. 113-117.*
International Search Report and Written Opinion received in International Application No. PCT/US2014/054590, mailed Jan. 2, 2015, 11 pages.

* cited by examiner

*Primary Examiner* — Beemnet Dada
(74) *Attorney, Agent, or Firm* — Slater Matsil, LLP

(57) ABSTRACT

Embodiments are provided for an asynchronous processor with a Hierarchical Token System. The asynchronous processor includes a set of primary processing units configured to gate and pass a set of tokens in a predefined order of a primary token system. The asynchronous processor further includes a set of secondary units configured to gate and pass a second set of tokens in a second predefined order of a secondary token system. The set of tokens of the primary token system includes a token consumed in the set of primary processing units and designated for triggering the secondary token system in the set of secondary units.

23 Claims, 10 Drawing Sheets

SYSTEM AND METHOD FOR AN ASYNCHRONOUS PROCESSOR WITH A HIERARCHICAL TOKEN SYSTEM

This application claims the benefit of U.S. Provisional Application No. 61/874,883 filed on Sep. 6, 2013 by Yiqun Ge et al. and entitled "Method and Apparatus for Asynchronous Processor with Hierarchical Token System," which is hereby incorporated herein by reference as if reproduced in its entirety.

TECHNICAL FIELD

The present invention relates to asynchronous processing, and, in particular embodiments, to system and method for an asynchronous processor with a hierarchical token system.

BACKGROUND

Micropipeline is a basic component for asynchronous processor design. Important building blocks of the micropipeline include the RENDEZVOUS circuit such as, for example, a chain of Muller-C elements. A Muller-C element can allow data to be passed when the current computing logic stage is finished and the next computing logic stage is ready to start. Instead of using non-standard Muller-C elements to realize the handshaking protocol between two clockless (without using clock timing) computing circuit logics, the asynchronous processors replicate the whole processing block (including all computing logic stages) and use a series of tokens and token rings to simulate the pipeline. Each processing block contains a token processing logic to control the usage of tokens without time or clock synchronization between the computing logic stages. Thus, the processor design is referred to as an asynchronous or clockless processor design. The token ring regulates the access to system resources. The token processing logic accepts, holds, and passes tokens between each other in a sequential manner. When a token is held by a token processing logic, the block can be granted the exclusive access to a resource corresponding to that token, until the token is passed to a next token processing logic in the ring. There is a need for an improved asynchronous processor architecture which can handle instructions and processing resources with more efficiency.

SUMMARY OF THE INVENTION

In accordance with an embodiment, a method performed by an asynchronous processor includes receiving, in a primary processing unit in a set of primary processing units of the asynchronous processor, a token belonging to a primary token system for gating and passing a set of tokens in a predefined order in the set of primary processing units. The token is designated for triggering, in a set of secondary units of the asynchronous processor, a secondary token system for gating and passing a second set of tokens in a second predefined order. The method further includes consuming the token in the primary processing unit, and in response to consuming the token in the primary processing unit, gating a start token in the second predefined order of the secondary token system in a secondary unit in the set of secondary units.

In accordance with another embodiment, a method performed by an asynchronous processor includes gating and passing, in a set of father processing units of the asynchronous processor, a set of tokens in a predefined order of a father token system. The method further includes consuming, in the set of father processing units, a token from the set of tokens, wherein the token is designated for triggering a child token system for gating and passing a second set of tokens in a second predefined order. In response to consuming the token in the set of father processing units, a set of child units of the asynchronous processor gates and passes the second set of tokens.

In accordance with yet another embodiment, an asynchronous processor comprises a set of primary processing units configured to gate and pass a set of tokens in a predefined order of a primary token system. The asynchronous processor further includes a set of secondary units configured to gate and pass a second set of tokens in a second predefined order of a secondary token system. The set of tokens of the primary token system includes a token consumed in the set of primary processing units and designated for triggering the secondary token system in the set of secondary units.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
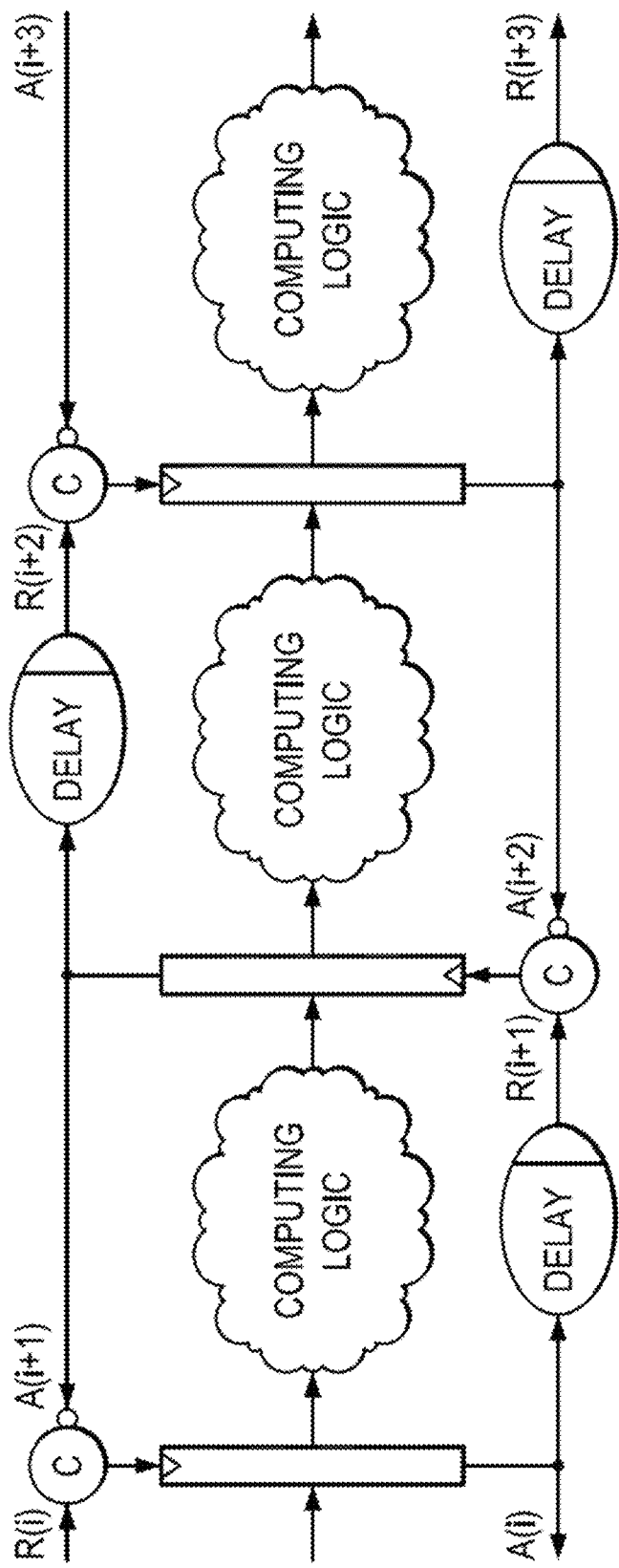
FIG. 1 illustrates a Sutherland asynchronous micropipeline architecture.

FIG. 1 illustrates a Sutherland asynchronous micropipeline architecture. The Sutherland asynchronous micropipeline architecture is one form of asynchronous micropipeline architecture that uses a handshaking protocol to operate the micropipeline building blocks. The Sutherland asynchronous micropipeline architecture includes a plurality of computing logics linked in sequence via flip-flops or latches. The computing logics are arranged in series and separated by the latches between each two adjacent computing logics. The handshaking protocol is realized by Muller-C elements (labeled C) to control the latches and thus determine whether and when to pass information between the computing logics. This allows for an asynchronous or clockless control of the pipeline without the need for timing signal. A Muller-C element has an output coupled to a respective latch and two inputs coupled to two other adjacent Muller-C elements, as shown. Each signal has one of two states (e.g., 1 and 0, or true and false). The input signals to the Muller-C elements are indicated by A(i), A(i+1), A(i+2), A(i+3) for the backward direction and R(i), R(i+1), R(i+2), R(i+3) for the forward direction, where i, i+1, i+2, i+3 indicate the respective stages in the series. The inputs in the forward direction to Muller-C elements are delayed signals, via delay logic stages The Muller-C element also has a memory that stores the state of its previous output signal to the respective latch. A Muller-C element sends the next output signal according to the input signals and the previous output signal. Specifically, if the two input signals, R and A, to the Muller-C element have different state, then the Muller-C element outputs A to the respective latch. Otherwise, the previous output state is held. The latch passes the signals between the two adjacent computing logics according to the output signal of the respective Muller-C element. The latch has a memory of the last output signal state. If there is state change in the current output signal to the latch, then the latch allows the information (e.g., one or more processed bits) to pass from the preceding computing logic to the next logic. If there is no change in the state, then the latch blocks the information from passing. This Muller-C element is a non-standard chip component that is not typically supported in function libraries provided by manufacturers for supporting various chip components and logics. Therefore, implementing on a chip the function of the architecture above based on the non-standard Muller-C elements is challenging and not desirable.

Figure 2:
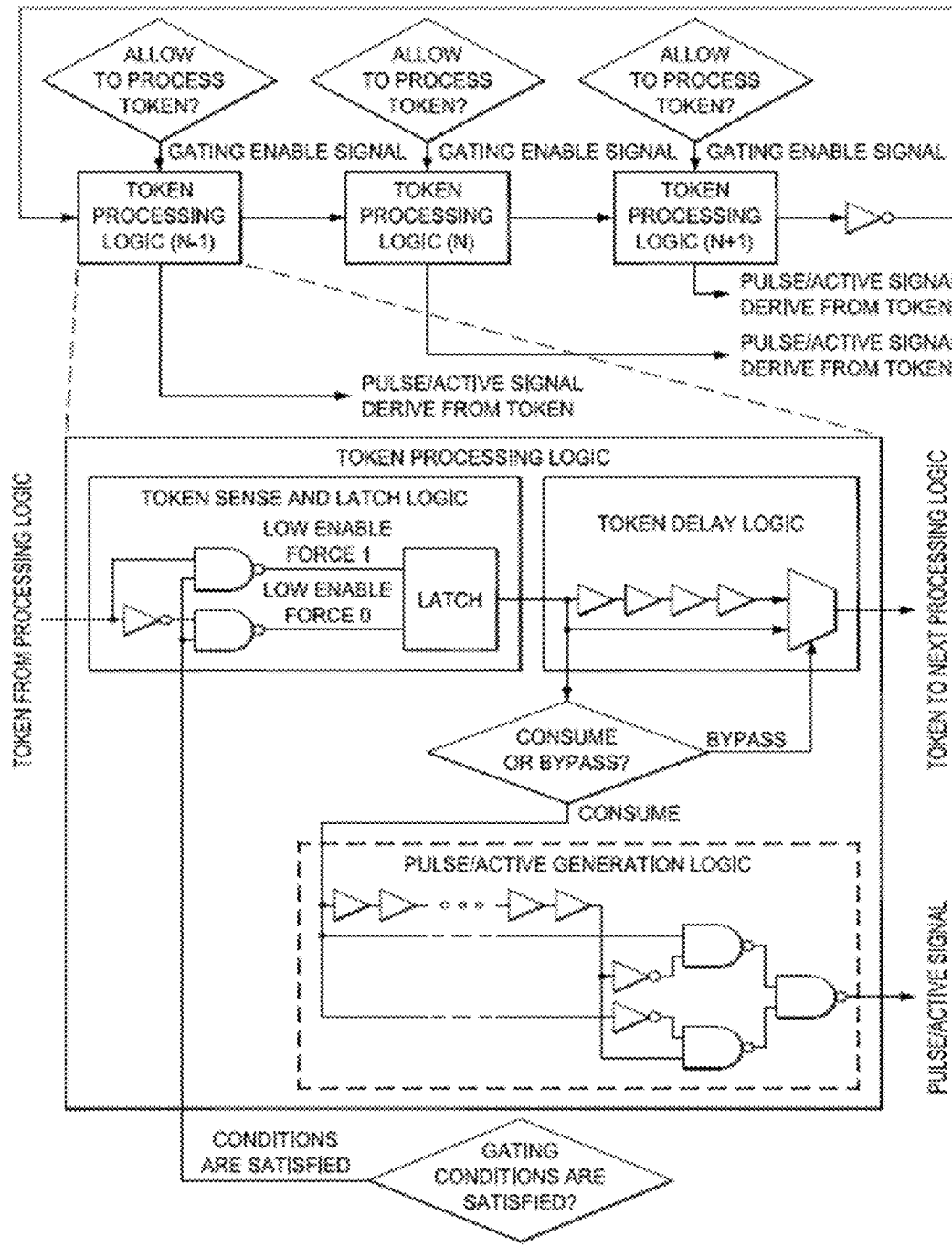
FIG. 2 illustrates a token ring architecture.

FIG. 2 illustrates an example of a token ring architecture which is a suitable alternative to the architecture above in terms of chip implementation. The components of this architecture are supported by standard function libraries for chip implementation. As described above, the Sutherland asynchronous micropipeline architecture requires the handshaking protocol, which is realized by the non-standard Muller-C elements. In order to avoid using Muller-C elements (as in FIG. 1), a series of token processing logics are used to control the processing of different computing logics (not shown), such as processing units on a chip (e.g., ALUs) or other functional calculation units, or the access of the computing logics to system resources, such as registers or memory. To cover the long latency of some computing logics, the token processing logic is replicated to several copies and arranged in a series of token processing logics, as shown. Each token processing logic in the series controls the passing of one or more token signals (associated with one or more resources). A token signal passing through the token processing logics in series forms a token ring. The token ring regulates the access of the computing logics (not shown) to the system resource (e.g., memory, register) associated with that token signal. The token processing logics accept, hold, and pass the token signal between each other in a sequential manner. When a token signal is held by a token processing logic, the computing logic associated with that token processing logic is granted the exclusive access to the resource corresponding to that token signal, until the token signal is passed to a next token processing logic in the ring. Holding and passing the token signal concludes the logic's access or use of the corresponding resource, and is referred to herein as consuming the token. Once the token is consumed, it is released by this logic to a subsequent logic in the ring.

Figure 3:
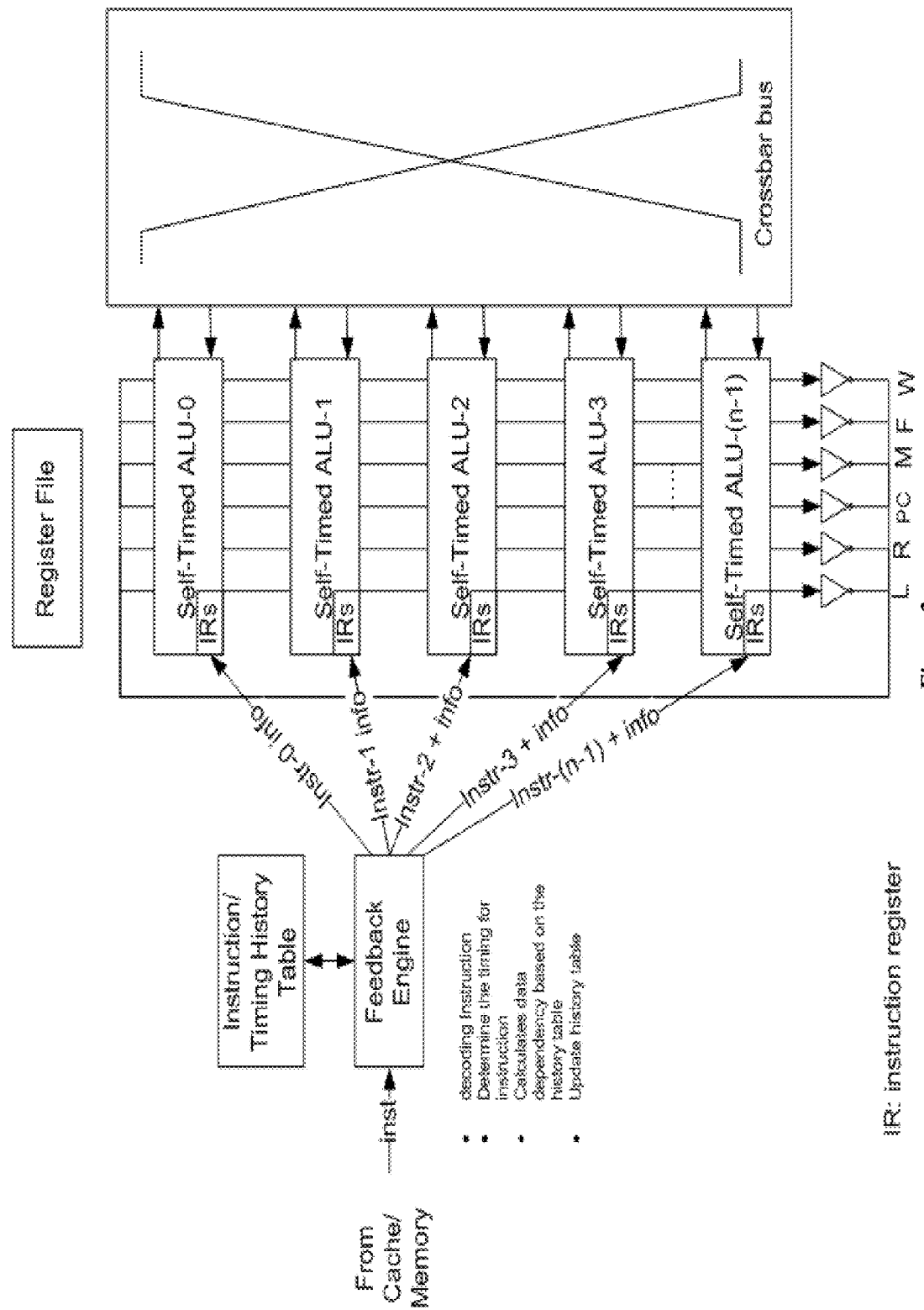
FIG. 3 illustrates an asynchronous processor architecture.

FIG. 3 illustrates an asynchronous processor architecture. The architecture includes a plurality of self-timed (asynchronous) arithmetic and logic units (ALUs) coupled in parallel in a token ring architecture as described above. The ALUs can comprise or correspond to the token processing logics of FIG. 2. The asynchronous processor architecture of FIG. 3 also includes a feedback engine for properly distributing incoming instructions between the ALUs, an instruction/timing history table accessible by the feedback engine for determining the distribution of instructions, a register file (or memory) accessible by the ALUs, and a crossbar bus for exchanging or transferring needed information between the ALUs. The table is used for indicating timing and dependency information between multiple input instructions to the processor system. The instructions from the instruction cache/memory go through the feedback engine which detects or calculates the data dependencies and determines the timing for instructions using the history table. The feedback engine pre-decodes each instruction to decide how many input operands this instruction requires. The feedback engine then looks up the history table to find whether this piece of data is on the crossbar bus or on the register file. If the data is found on the crossbar bus, the feedback engine calculates which ALU produces the data. This information is tagged to the instruction dispatched to the ALUs. The feedback engine also updates accordingly the history table. The components and functions of the architecture above can be implemented by any suitable circuit logic.

Figure 4:
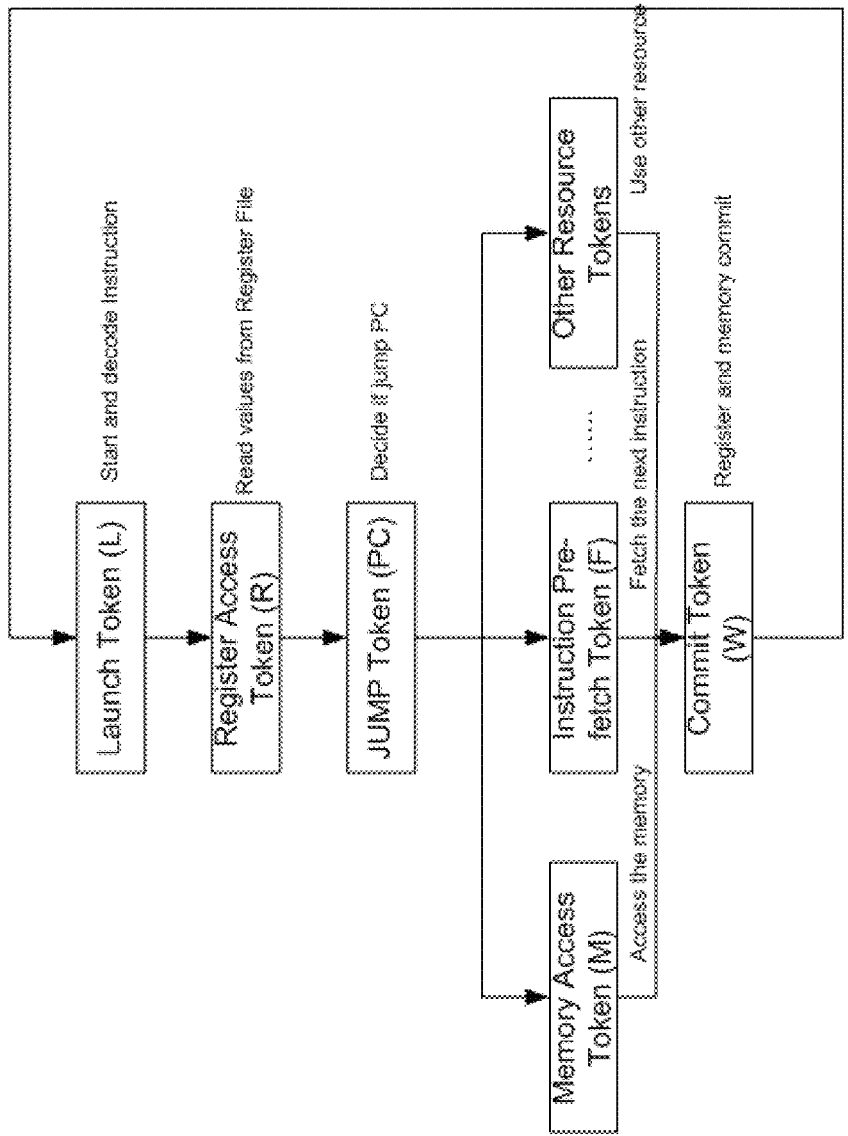
FIG. 4 illustrates token based pipelining with gating within an arithmetic and logic unit (ALU)

FIG. 4 illustrates token based pipelining with gating within an ALU, also referred to herein as token based pipelining for an intra-ALU token gating system. According to this pipelining, designated tokens are used to gate other designated tokens in a given order of the pipeline. This means when a designated token passes through an ALU, a second designated token is then allowed to be processed and passed by the same ALU in the token ring architecture. In other words, releasing one token by the ALU becomes a condition to consume (process) another token in that ALU in that given order. FIG. 4 illustrates one possible example of token-gating relationship. The tokens used include a launch token (L), a register access token ®, a jump token (PC), a memory access token (M), an instruction pre-fetch token (F), optionally other resource tokens, and a commit token (W). Consuming (processing) the L token enables the ALU to start and decode an instruction. Consuming the R token enables the ALU to read values from a register file. Consuming the PC token enables the ALU to decide whether a jump to another instruction is needed in accordance with a program counter (PC). Consuming the M token enables the ALU to access a memory that caches instructions. Consuming the F token enables the ALU to fetch the next instruction from memory. Consuming other resources tokens enables the ALU to use or access such resources. Consuming the W token enables the ALU to write or commit the processing and calculation results for instructions to the memory. Specifically, in this example, the launch token (L) gates the register access token (R), which in turn gates the jump token (PC token). The jump token gates the memory access token (M), the instruction pre-fetch token (F), and possibly other resource tokens that may be used. This means that tokens M, F, and other resource tokens can only be consumed by the ALU after passing the jump token. These tokens gate the commit token (W) to register or memory. The commit token is also referred to herein as a token for writing the instruction. The commit token in turn gates the lunch token. The gating signal from the gating token (a token in the pipeline) is used as input into a consumption condition logic of the gated token (the token in the next order of the pipeline). For example, the launch-token (L) generates an active signal to the register access or read token (R), when L is released to the next ALU. This guarantees that any ALU would not read the register file until an instruction is actually started by the launch-token.

Figure 5:
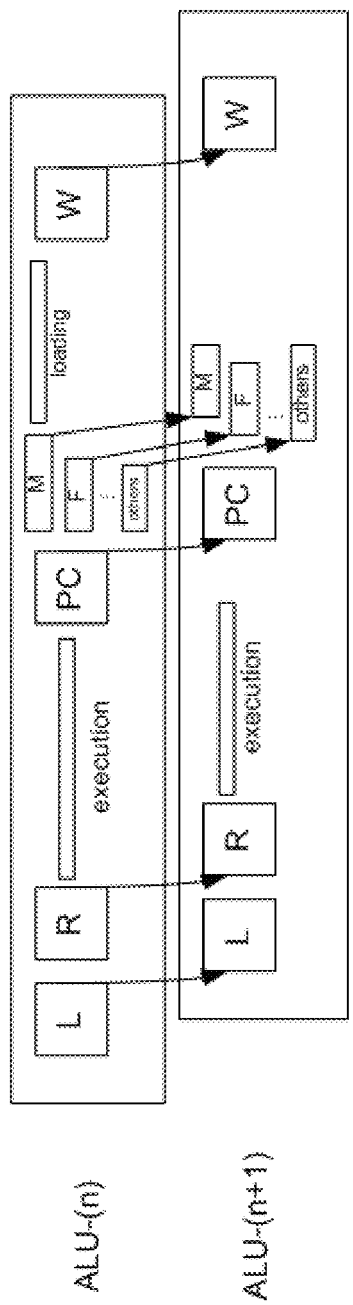
FIG. 5 illustrates token based pipelining with passing between ALUs.

FIG. 5 illustrates token based pipelining with passing between ALUs, also referred to herein as token based pipelining for an inter-ALU token passing system. According to this pipelining, a consumed token signal can trigger a pulse to a common resource. For example, the register-access token (R) triggers a pulse to the register file. The token signal is delayed before it is released to the next ALU for such a period, preventing a structural hazard on this common resource (the register file) between ALU-(n) and ALU-(n+1). The tokens preserve multiple ALUs from launching and committing (or writing) instructions in the program counter order, and also avoid structural hazard among the multiple ALUs.

Various embodiments are provided herein for a hierarchical token system for improving the handling of processing resources with more efficiency. In the embodiments, a father token gate and pass system is executed on a father unit, and a child token gate and pass system is executed on a child unit. For instance, the father token system can be implemented over a plurality of ALU units, and the child token system can be implemented over a plurality of resource/functional units other than the ALUs. The father unit and child unit can be separated physically, where the father unit does not comprise the child unit. The father unit and child unit can operate in different modes or schemes, as described below. The embodiments below illustrate how to integrate a father unit and a child unit to in two token systems. In other embodiments, a plurality of child token systems are gated by the father token system, where the principles of operations below can be extended to integrate a set of father units system and multiple sets of child units using three or more token systems.

Figure 6:
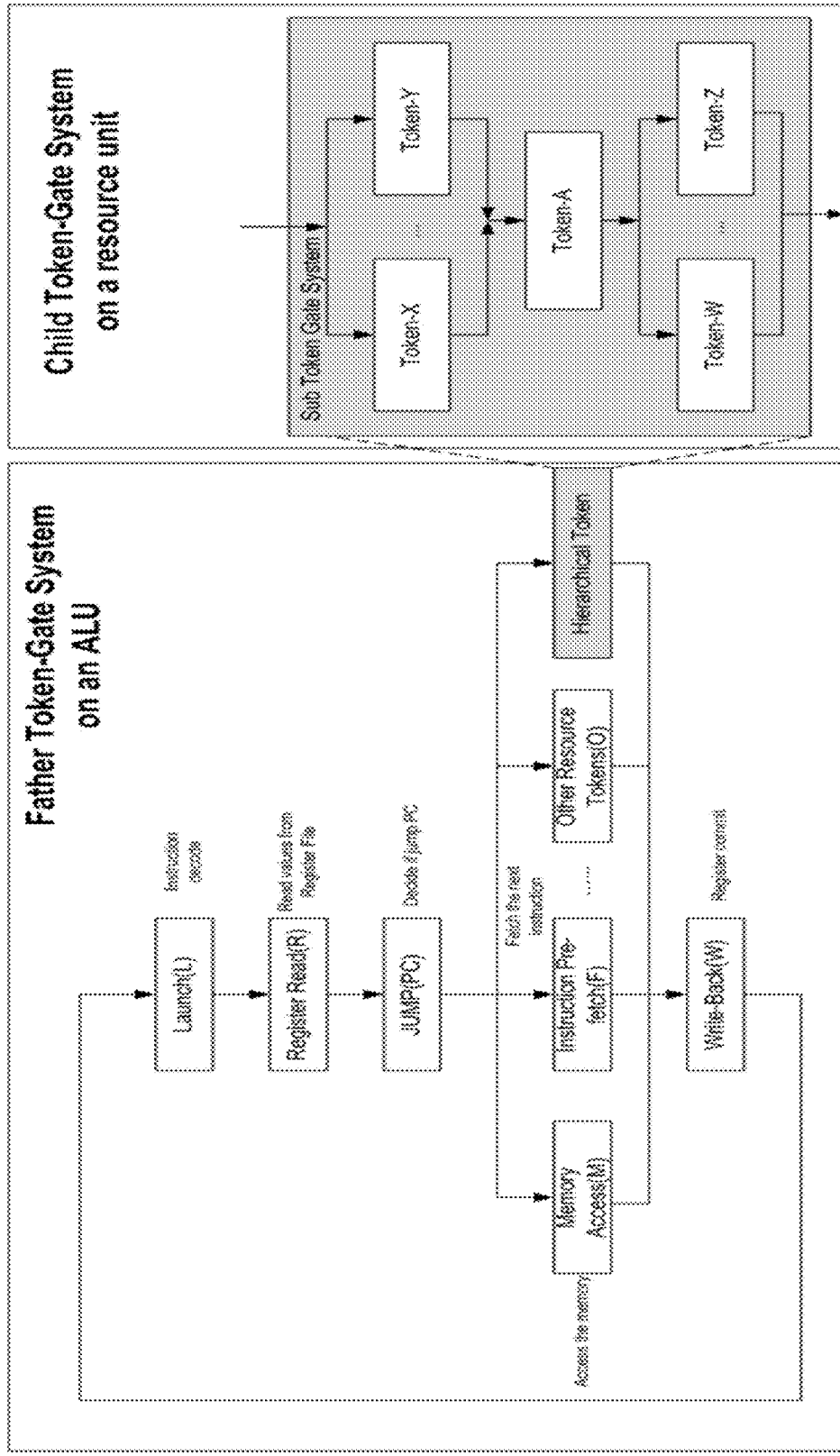
FIG. 6 illustrates an embodiment of a hierarchical token system model.

FIG. 6 illustrates an embodiment of a hierarchical token system model. The model includes a father (or primary) token gate system used by a plurality of primary processing units such as ALUs, and a child (or secondary) token gate system used by a plurality of resource units. A first mode or scheme, referred to herein as the "hold it walk" mode, is used to extend the father system to the child system. As an example, the father token system is configured similar to the token system of FIG. 4. In addition to the tokens of that system, the father token system of FIG. 6 includes a new designated token (labeled hierarchical token) that gates the child token system. Specifically, the child token system is triggered on a child (secondary) unit, e.g., resource unit, by a consumption of this token of the father token system. The child token system includes a plurality of tokens that control operations and functions of child or resource units, e.g., registers, buffers, resources/functions supporting the ALUs' operations, or function units other than the ALUs. The tokens of the child system can be gated and passed according to any suitable predefined order (pipelining). The child token system does not form a closed loop. Therefore, when the last token of the child system is consumed (e.g., Token-W or Token-Z), the child token system returns gating signals back to its father token system. The father token system is then resumed by the ALUs to consume a token (e.g., the W token) subsequent to the hierarchical token. In an embodiment comprising multiple child token systems corresponding to multiple sets of child units, each child system can be triggered by a corresponding designated token of the father token system.

Figure 7:
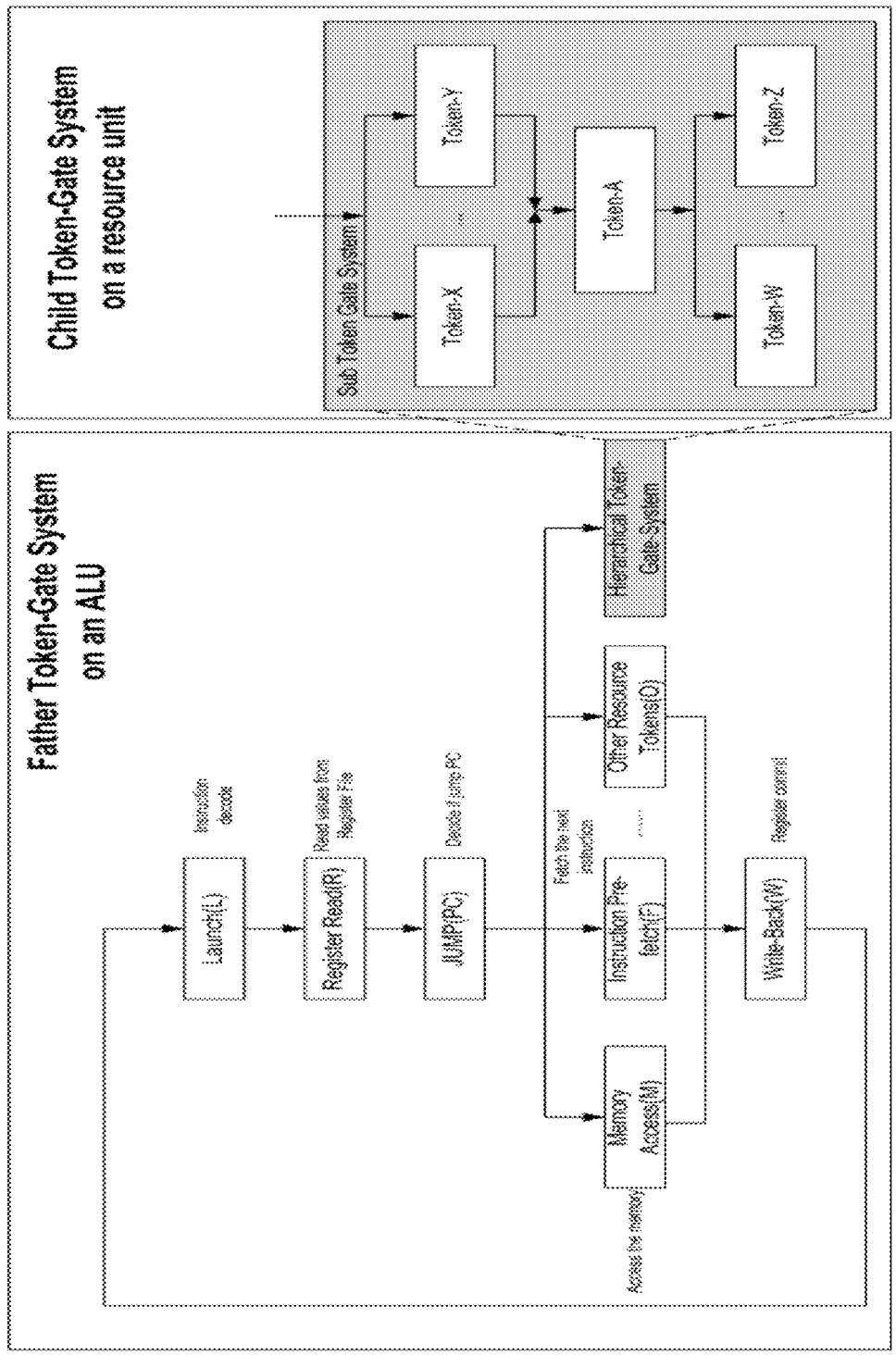
FIG. 7 illustrates another embodiment of a hierarchical token system model.

FIG. 7 illustrates another embodiment of a hierarchical token system model. The model also includes a father token gate system on a plurality of ALUs and a child token gate system on a plurality of resource units. A second mode or scheme, referred to herein as the "let it fly" mode, is used to extend the father system to the child system. Similar to the scheme above, in this scheme, the child token system is triggered by a consumption of one designated token (labeled hierarchical token-gate system) of its father token system, and does not form a closed loop. However, unlike the scheme above, in this scheme, the child token system does not return any signals back to its father token system. As such, when the hierarchical token of the father system triggers the child system, the father token system is not held in wait for a return signal from the child system and the ALUs continue gating an passing the tokens of the father system without delay, independently of the child system's operations.

Figure 8:
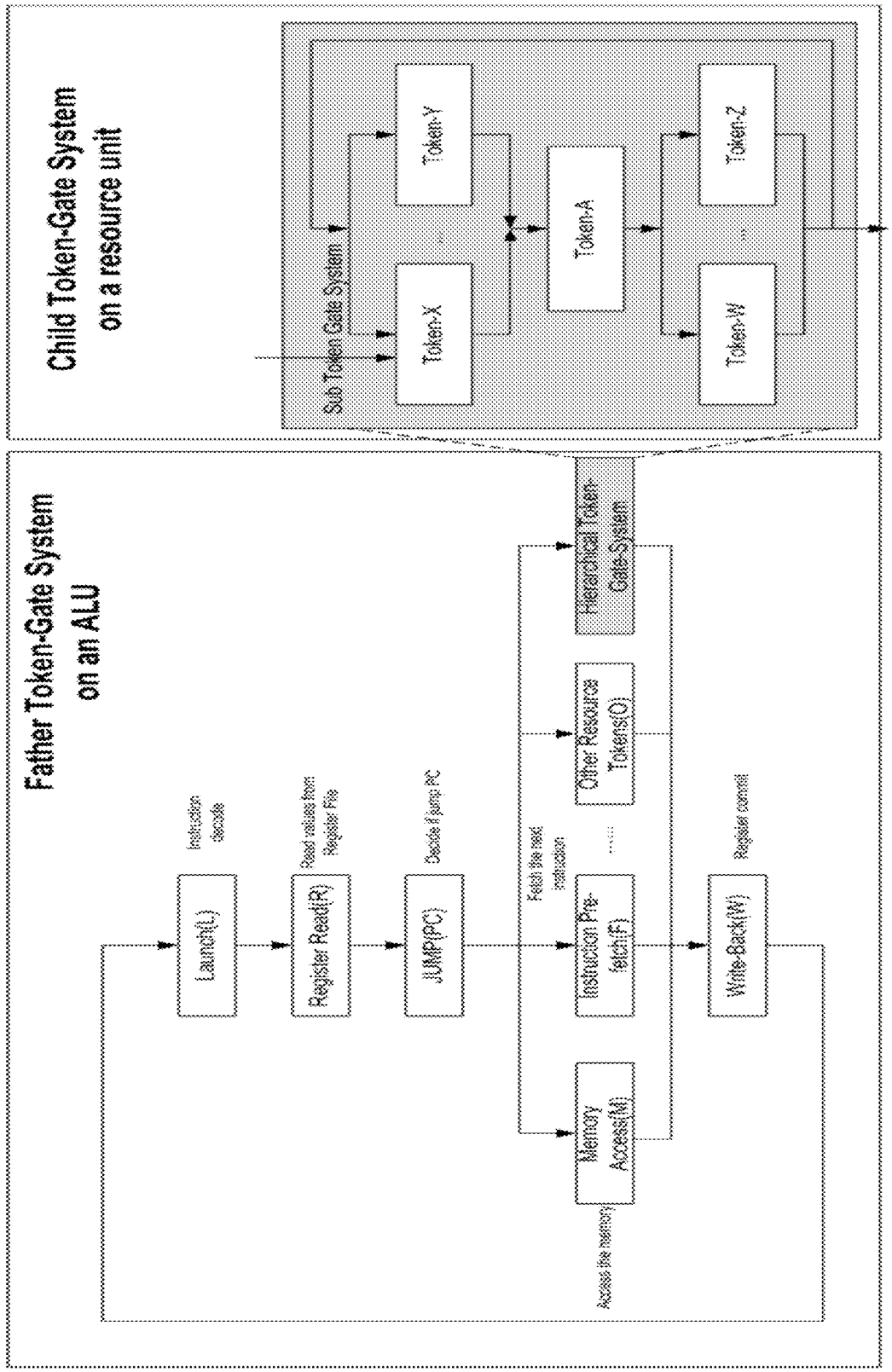
FIG. 8 illustrates another embodiment of a hierarchical token system model.

FIG. 8 illustrates another embodiment of a hierarchical token system model. This model implements a third scheme or mode, referred to herein as the "let's synchronize" mode, between the father token system on a plurality of ALUs and the child token system on a plurality of resource units. In this scheme, the consumption of one designated token (labeled hierarchical token-gate system) of the father token system is one of the gating conditions of one token of the child token system (labeled Token-X). The child token system forms a closed loop, where the last gated token(s) in the child system also gate(s) the first token(s) of the child system, including the token (Token-X) gated by the hierarchical token of the father system. Further, the child token system returns gating signals back to its father token system. The father token system is then resumed by the ALUs to consume a token (e.g., the W token) subsequent to the hierarchical token.

Figure 9:
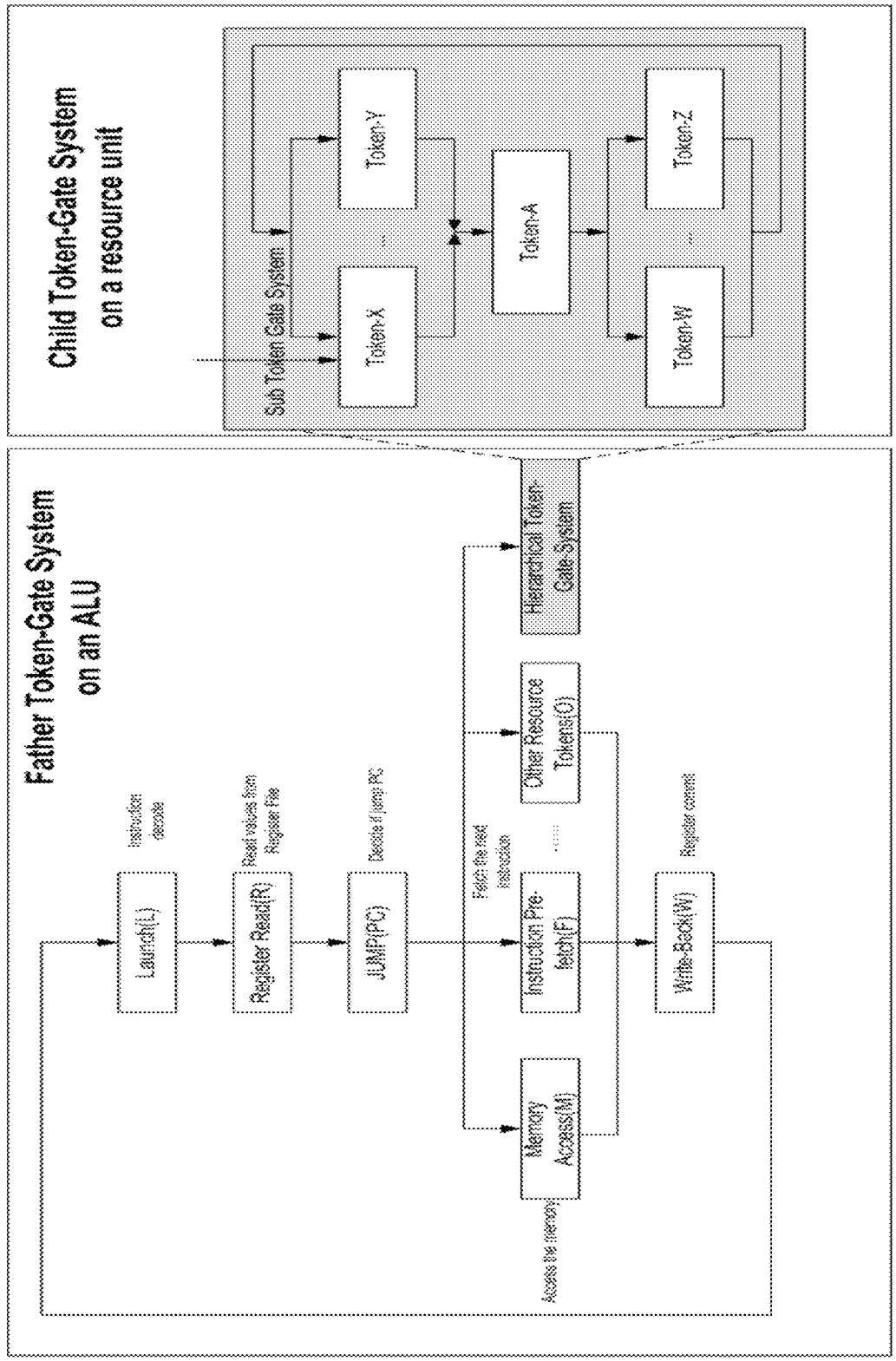
FIG. 9 illustrates another embodiment of a hierarchical token system model.

FIG. 9 illustrates another embodiment of a hierarchical token system model. This model implements a fourth scheme, referred to herein as the "let me help you" mode, between the father token system on a plurality of ALUs and the child token system on a plurality of resource units. As in the "let's synchronize" scheme above, in the "let me help you" scheme, the consumption of one designated token (labeled hierarchical token-gate system) of the father token system is one of the gating conditions of one token (labeled Token-X) of the child token system. The child token system also forms a closed loop, where the last gated token(s) in the child system gate(s) the first token(s) of the child system. However, the child token system does not return any signals to its father token system. As such, when the hierarchical token of the father system triggers the child system, the father token system is not held in wait for a return signal from the child system and the ALUs continue gating an passing the tokens of the father system without delay, independently of the child system's operations.

The system and method embodiments herein are described in the context of an ALU set in the asynchronous processor. The ALUs serve as instruction processing units that perform calculations and provide results for the corresponding issued instructions. However in other embodiments, the processor may comprise other instruction processing units instead of the ALUs. The instruction units may be referred to sometimes as execution units (XUs) or execution logics, and may have similar, different or additional functions for handling instructions than the ALUs described above. In general, the system and method embodiments described herein can apply to any suitable hierarchical token system model comprising a father token system on a plurality of XUs and at least one child token system on a plurality of resource units.

Figure 10:
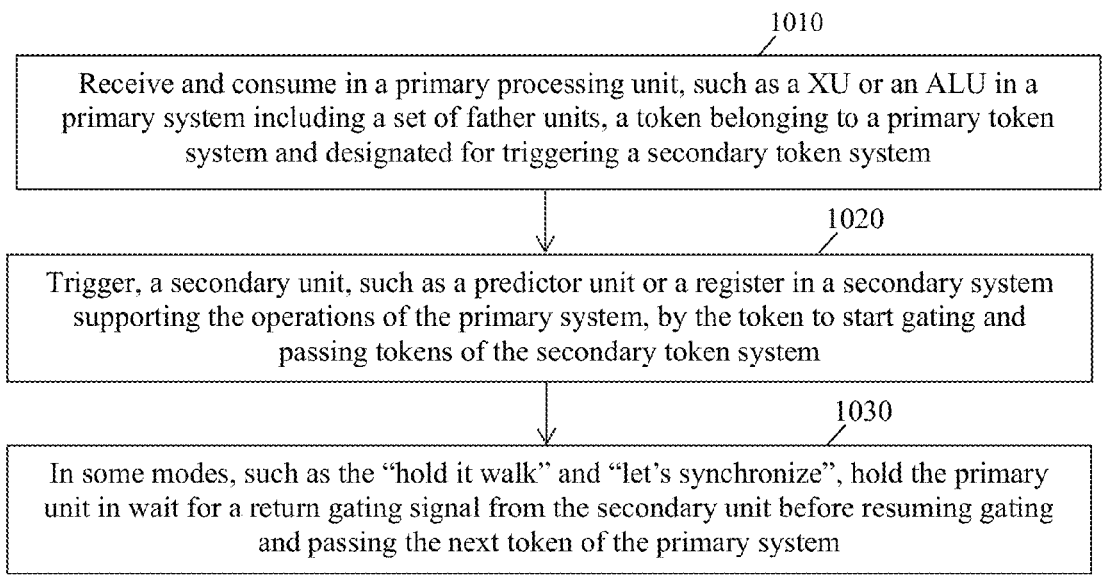
FIG. 10 illustrates an embodiment of a method for a hierarchical token system model.

FIG. 10 illustrates an embodiment of a method for a hierarchical token system model. For instance, the method can be implemented using any of the hierarchical token system models described above. At step 1010, a primary processing unit, such as a XU or an ALU in a primary system including a set of primary processing units, receives and consumes a token belonging to a primary token system and designated for triggering a secondary token system. At step 1020, a secondary unit, such as a predictor unit or a register in a secondary system supporting the operations of the primary system, is triggered by the token to start gating and passing tokens of the secondary token system. In some modes, such as the "hold it walk" and "let's synchronize", the primary unit waits, at step 1030, for a return gating signal from the secondary unit to resume gating and passing the next token of the primary system.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by an asynchronous processor using a hierarchical token system, the method comprising:
    receiving, by a primary processing unit in a set of primary processing units of a primary token system of the asynchronous processor, a father token belonging to the primary token system for gating and passing a set of father tokens in a predefined order in the set of primary processing units, wherein the primary token system includes a closed loop token system, wherein the father token is designated for triggering, in a set of secondary units of the hierarchical token system of the asynchronous processor, a secondary token system for gating and passing a set of child tokens in a second predefined order, and wherein the set of primary processing units and the set of secondary units are different;
    consuming the father token in the primary processing unit; and
    in response to consuming the father token in the primary processing unit, gating a start child token in the second predefined order of the secondary token system in a secondary unit in the set of secondary units.

2. The method of claim 1, further comprising, in response to consuming the father token in the primary processing unit, repeating as a loop logic, in the secondary unit, gating and passing the set of child tokens in the second predefined order.

3. The method of claim 1, further comprising ending, in the secondary unit, gating and passing the set of child tokens after consuming a last child token in the second predefined order of the secondary token system.

4. The method of claim 1, further comprising returning a gating signal from the secondary unit to the primary processing unit upon consuming a last child token in the second predefined order of the secondary token system.

5. The method of claim 4, further comprising, upon receiving the gating signal from the secondary unit at the primary processing unit, resuming gating and passing a next father token subsequent to the father token in the predefined order for gating and passing the set of father tokens of the primary token system.

6. The method of claim 1, further comprising continuing without waiting on the secondary unit, after consuming the father token in the primary processing unit, gating and passing a next father token subsequent to the father token in the predefined order for gating and passing the set of father tokens of the primary token system.

7. The method of claim 1, further comprising:
    receiving, in the primary processing unit, a second father token belonging to the primary token system, wherein the second father token is designated for triggering, in a set of second secondary units of the asynchronous processor, a second child token system for gating and passing a third set of tokens in a third predefined order;
    consuming the second father token in the primary processing unit; and
    in response to consuming the second father token in the primary processing unit, gating a second start child token of the second child token system in a second secondary unit in the set of second secondary units.

8. The method of claim 1, wherein the primary processing unit is an instruction execution unit or an arithmetic and logic unit (ALU), and wherein the secondary unit is a resource or functional unit supporting instruction processing at the primary processing unit.

9. A method performed by an asynchronous processor using a hierarchical token system, the method comprising:
    gating and passing, in a set of father processing units of a father token system of the asynchronous processor, a set of father tokens in a predefined order, wherein the father token system includes a closed loop token system;
    consuming, in any one of the father processing units, a father token from the set of father tokens, wherein the father token is designated for triggering a child token system for gating and passing a set of child tokens in a second predefined order in a set of child units, and wherein the set of father processing units and the set of child units are different; and in response to consuming the father token in the set of father processing units, gating and passing the set of child tokens in the set of child units of the hierarchical token system of the asynchronous processor.

10. The method of claim 9, further comprising:

consuming, in the set of father processing units, a second father token from the set of father tokens, wherein the second father token is designated for triggering a second child token system for gating and passing a third set of tokens in a third predefined order; and in response to consuming the second father token in the set of father processing units, gating and passing the third set of tokens in a second set of child units of the asynchronous processor.

11. The method of claim 9, further comprising repeating in the set of child units the gating and passing of the set of child tokens in the second predefined order of the child token system.

12. The method of claim 9, further comprising ending in the set of child units the gating and passing of the set of child tokens after consuming a last child token in the second predefined order of the child token system.

13. The method of claim 9, further comprising returning gating signals from the set of child units to the set of father processing units upon consuming a last child token in the second predefined order of the child token system.

14. The method of claim 13, further comprising, upon receiving the gating signals from the set of child units at the set of father processing units, resuming gating and passing a next father token subsequent to the father token in the predefined order of the father token system.

15. The method of claim 9, further comprising continuing without waiting on the set of child units, after consuming the father token in the set of father processing units, gating and passing a next father token subsequent to the father token in the predefined order of the father token system.

16. An apparatus for an asynchronous processor comprising:

a memory configured to cache a plurality of instructions;
a feedback engine configured to decode the instructions;
a set of primary processing units configured to process the instructions decoded by the feedback engine and to gate and pass a set of tokens in a predefined order of a primary token system of a hierarchical token system, wherein the primary token system includes a closed loop token system; and
a set of secondary units configured to support processing of the instructions and gate and pass a second set of tokens in a second predefined order of a secondary token system of the hierarchical token system, wherein the set of tokens of the primary token system includes a token consumed in any one of the primary processing units and designated for triggering the secondary token system in the set of secondary units, and wherein the set of primary processing units and the set of secondary units are different.

17. The apparatus of claim 16, further comprising a second set of secondary units configured to gate and pass a third set of tokens in a third predefined order of a second secondary token system, wherein the set of tokens of the primary token system includes a second token consumed in the set of primary processing units and designated for triggering the second secondary token system in the second set of secondary units.

18. The apparatus of claim 16, wherein the set of secondary units is configured to repeat gating and passing the second set of tokens in the second predefined order of the secondary token system.

19. The apparatus of claim 16, wherein the set of secondary units is configured to return a gating signal to the set of primary processing units upon consuming a last token in the second predefined order of the secondary token system.

20. The apparatus of claim 19, wherein the set of primary processing units is configured to receive the gating signal from the set of secondary units and resume gating and passing a next token subsequent to the token in the predefined order of the primary token system.

21. The apparatus of claim 16, wherein the set of primary processing unit includes instruction execution units or arithmetic and logic units (ALUs), and wherein the set of secondary units includes resource or functional units supporting instruction processing at the set of primary processing units.

22. An apparatus for an asynchronous processor comprising:

a memory configured to cache a plurality of instructions;
a feedback engine configured to decode the instructions;
a primary processing unit configured to receive and consume a token belonging to a primary token system for gating and passing a set of tokens in a predefined order in a set of primary processing units of a hierarchical token system, wherein the primary token system includes a closed loop token system, wherein the token is designated for triggering, in a set of secondary units, a secondary token system for gating and passing a second set of tokens in a second predefined order; and
a secondary unit configured of the set of secondary units, in response to consuming the token in the primary processing unit, to gate a start token in the second predefined order of the secondary token system of the hierarchical token system, wherein the set of primary processing units and the set of secondary units are different.

23. The apparatus of claim 22, wherein the primary processing unit is an instruction execution unit or an arithmetic and logic unit (ALU), and wherein the secondary unit is a resource or functional unit supporting instruction processing at the primary processing unit.

* * * * *

UNITED STATES PATENT AND TRADEMARK OFFICE
CERTIFICATE OF CORRECTION

PATENT NO. : 9,495,316 B2
APPLICATION NO. : 14/480330
DATED : November 15, 2016
INVENTOR(S) : Yiqun Ge Page 1 of 1

It is certified that error appears in the above-identified patent and that said Letters Patent is hereby corrected as shown below:

On the Title Page

Item (72) Inventors, Line 3, delete "CN" and insert --CA--.

Signed and Sealed this
Twenty-fifth Day of April, 2017

Michelle K. Lee
*Director of the United States Patent and Trademark Office*